United States Patent

[11] 3,613,617

| [72] | Inventor | Miles H. Hamilton<br>Pasadena, Calif. |
|---|---|---|
| [21] | Appl. No. | 15,769 |
| [22] | Filed | Mar. 17, 1960 |
| [45] | Patented | Oct. 19, 1971 |
| [73] | Assignee | The United States of America as represented by the Secretary of the Navy |

[54] ROCKET-THROWN WEAPON
6 Claims, 6 Drawing Figs.

[52] U.S. Cl. ........................... 114/20 R,
102/7, 102/49.4, 244/3.25
[51] Int. Cl. ........................... F42b 15/22,
F42b 17/00, F42b 19/00
[50] Field of Search ........................... 102/4, 7,
7.2, 13, 34.4, 35.6, 49, 49.4, 49.5; 60/35.6 R;
114/20, 21.1

[56] References Cited
UNITED STATES PATENTS

| 2,654,320 | 10/1953 | Schmid | 102/49 |
| 2,655,105 | 10/1953 | Honsche | 102/49 |
| 2,686,473 | 8/1954 | Vogel | 102/49 |
| 2,850,976 | 9/1958 | Seifert | 102/49 |

OTHER REFERENCES
Aviation Week, Vol. 68, No. 8, pgs. 56, 57, Feb. 24, 1958. Copy in Scientific Library and Div. 10, published by McGraw-Hill.

*Primary Examiner*—Benjamin A. Borchelt
*Assistant Examiner*—Thomas H. Webb
*Attorneys*—W. O. Quesenberry and V. C. Muller CLAIM: 1. A missile for use against a target submarine, comprising, in combination:

a forward section including a payload apparatus for delivery to a suspect water area;

a rocket motor stationed rearwardly of said forward section and in axial alignment therewith, to provide a thrust phase of missile flight;

said rocket motor comprising a nozzle structure at its aft extremity to direct rocket motor pressurized propellant gases rearwardly, and further having a port at its forward extremity;

a bulkhead structure stationed immediately forward of said rocket motor and in obturating relationship to said port;

releasing fastening means securing said rocket motor to said forward section and maintaining said port-obturating relationship;

said port having an orifice area greater than the effective orifice area of said nozzle structure;

said rocket motor thereby being continuously subjected, during generation of pressurized propellant gases, to a net force tending to separate it from said airframe and bulkhead structure;

said rocket motor having a characteristic maximum period of thrust generation;

and means for releasing said fastening means, whereby to separate and jettison said rocket motor and correspondingly terminate said thrust phase of missile flight, predeterminedly during missile flight and prior to expiration of said characteristic maximum period.

PATENTED OCT 19 1971

INVENTOR.
MILES H. HAMILTON
BY
ATTORNEYS.

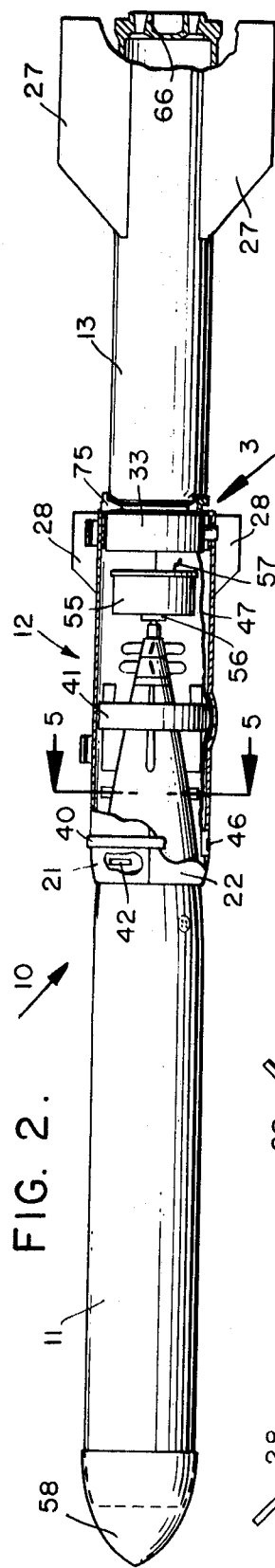
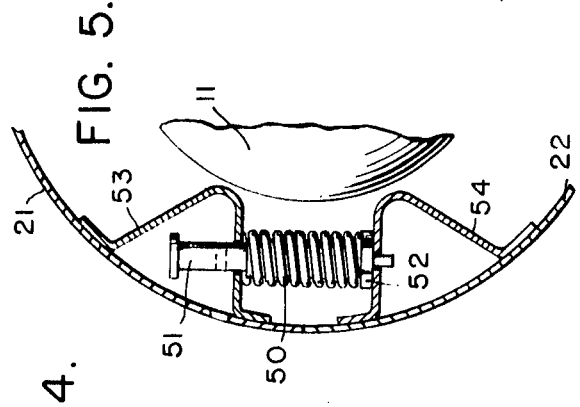
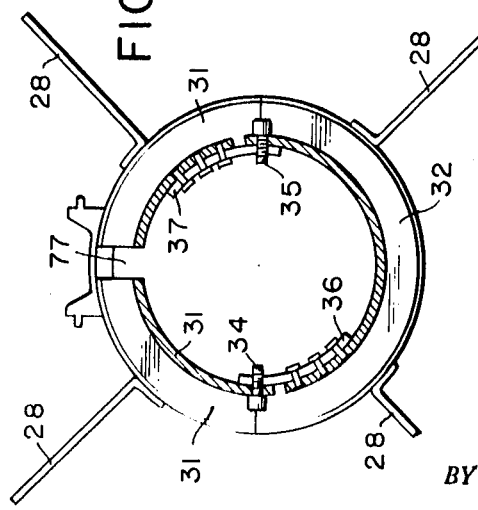
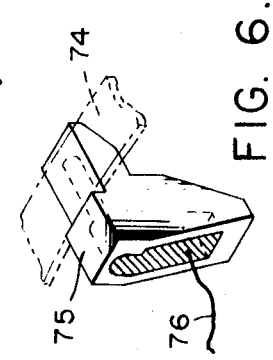

ROCKET-THROWN WEAPON

The invention described herein may be manufactured and used by or for the Government of The United States of America for governmental purposes without the payment of any royalties thereon or therefor.

This invention relates to antisubmarine weapons, and more particularly to a class of weapons wherein an antisubmarine payload apparatus is provided with a rearwardly extending airframe powered by a solid-propellant rocket motor, and operating to project itself into a ballistic air flight trajectory directed toward a suspect target area, and further operating thereafter to free the payload apparatus from its airframe and other air flight appurtenances so that it may proceed unimpeded in an underwater phase of attack. Rocket-thrown weapons of this class are capable of effecting delivery of antisubmarine payloads, such as homing torpedoes, to comparatively distant underwater targets in shorter times, and therefore with greater kill probability, than is possible with earlier shipborne homing torpedoes having principally an underwater mode of transport to the target area.

The water-entry range of prototype weapons of the general class mentioned above is adjustable by means of a presettable timing apparatus which controls the instant at which the airframe is jettisoned, and at which a drag parachute comes into play to initiate deceleration of the payload prior to water entry. The maximum water-entry range is of course dependent upon the rocket motor size, but it is characteristic of these prototype weapons that the maximum rocket motor size (in terms of total impulse rating) which can be employed is limited by the necessary minimum water-entry range capability imposed by tactical considerations. Such prototype weapons are described in copending and commonly assigned U.S. Pat. applications Ser. No. 790,976 of H. G. Johnson et al. for "Missile" filed Feb. 3, 1959, and Ser. No. 816,008 of J. T. Bartling et al. for "Rocket-Assisted Torpedo" filed May 26, 1959, which issued as U.S. Pat. No. 3,088,403 on May 7, 1963.

An extension of maximum water-entry range, with retention of the necessary minimum range characteristic which in the above-mentioned prototype weapons was incompatible with such increased range, has been shown to be feasible and practicable by modifying the prototype weapons to employ, together with the airframe jettisoning and payload deceleration technique, the additional concept of terminating motor thrust at a predetermined instant prior to motor burnout, as disclosed in copending and commonly assigned U.S. Pat. application Ser. No. 8,201 of O. J. Saholt et al. for "Rocket-Thrown Missile" filed Feb. 11, 1960. However, while the latter application describes a workable embodiment of the novel concept involving thrust cutoff as an additional range-controlling factor, the particular combination presented by the foregoing "Rocket-Thrown Missile," wherein thrust cutoff is effected by jettisoning the rocket motor nozzle structure, requires ruggedization of many of the components in the assembly in order to withstand a thrust spike (a transient thrust force of comparatively large magnitude) which is experienced at the nozzle jettisoning instant.

It is accordingly the principal object of the present invention to provide an extended range type of adjustable-range rocket-thrown antisubmarine weapon of the above-described class, and wherein rocket motor thrust cutoff at a preselected instant prior to motor burnout is effected without production of an excessively large thrust spike.

A further object is to provide an improved adjustable-range rocket-thrown antisubmarine weapon as above wherein thrust cutoff is accompanied by jettisoning of the rocket motor without disturbance to air flight stability of the weapon.

Other objects and attendant advantages of this invention will be readily appreciated as the same becomes better understood by reference to the following detailed description when considered in connection with the accompanying drawings wherein:

FIG. 2 illustrates the overall configuration of the improved weapon and the stationing of various components therein;

FIG. 3 is a lateral sectional view taken in the region indicated by arrow 3 in FIG. 2, detailing the rocket motor supporting and jettisoning structure;

FIG. 4 is an axial sectional view of the airframe hinging structure taken along the line 4—4 in FIG. 3;

FIG. 5 is a sectional view taken along line 5—5 in FIG. 2, detailing an ejection spring arrangement employed in the airframe; and FIG. 6 is a perspective view of an explosive block device employed in the rocket motor holding and thrust cutoff structure.

Figure 1:
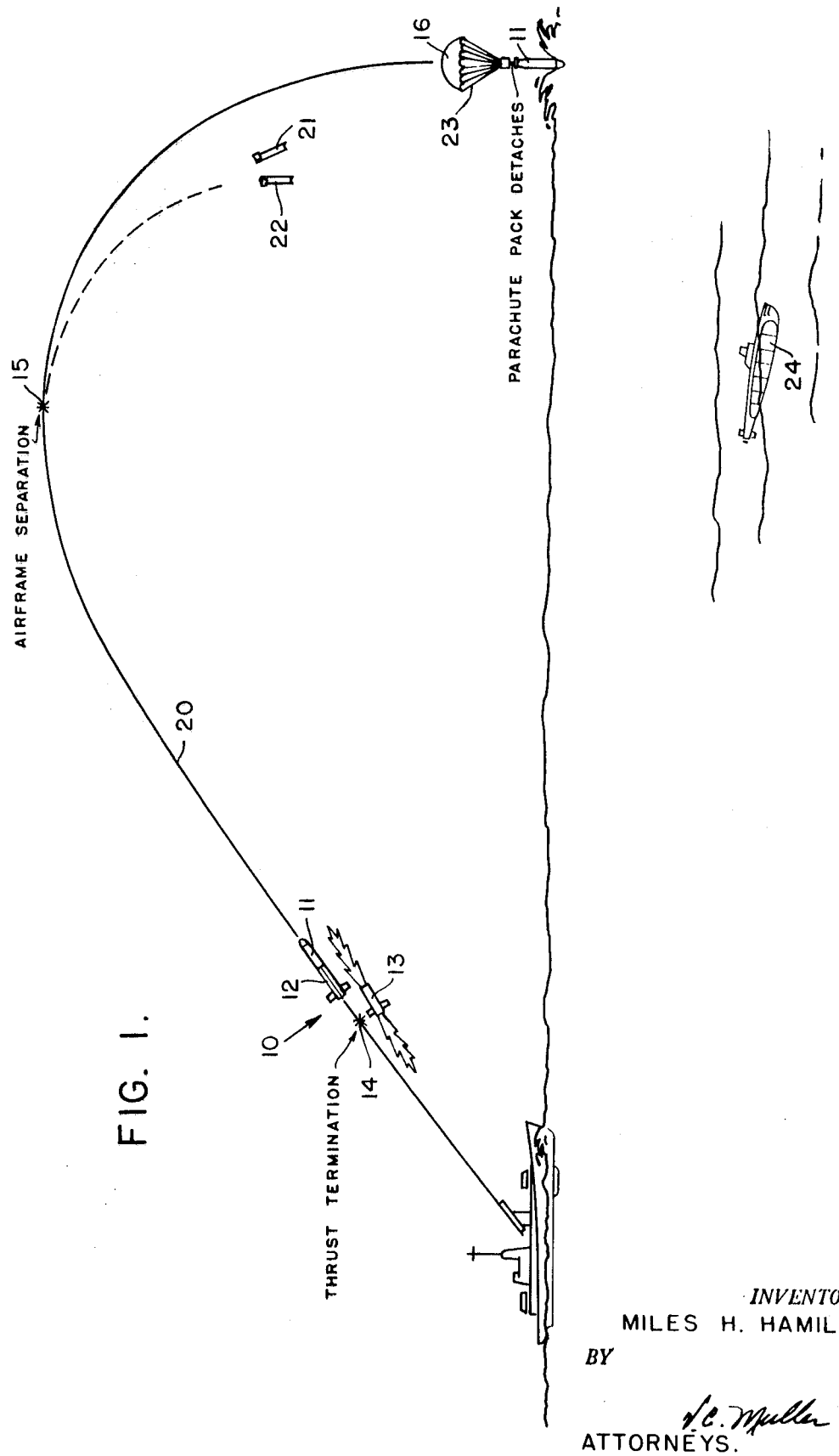
FIG. 1 depicts diagrammatically and in general manner the above water operational characteristics of the improved antisubmarine weapon.

The improved rocket-thrown antisubmarine weapon provided in accordance with the present invention is based upon the concept of accomplishing thrust cutoff by overcoming the forward thrust of its solid-propellant rocket motor, at a preselected instant prior to normal burnout time, and further by means of rearwardly directed thrust and in such manner as to simultaneously jettison the rocket motor, as will appear.

First described generally as to components and overall mode of operation of the weapon, and with reference to FIG. 1 which illustrates diagrammatically its air flight path and the sequence of events therealong which lead to delivery of the payload to a suspect target area, the improved rocket-thrown antisubmarine weapon 10 comprises the payload 11, and a comparatively short airframe 12 severably joined to payload 11 and extending rearwardly therefrom. Airframe 12 here comprises a pair of hinged members which are held in engagement against payload 11 by means of a banding arrangement. Rocket motor 13 initially forms a rearwardly extending prolongation of airframe 12, and provides forwardly directed thrust to project the weapon from any suitable launcher carried by say, a destroyer or other warship as indicated. As in the earlier mentioned "Rocket-Thrown Missile," the present weapon carries presettable control or programming apparatus of any type suitable to provide two sequential squib-firing voltages, functioning to terminate weapon thrust (and in this instance simultaneously jettisoning the rocket motor), say, at point 14 along the air flight path as indicated, and later to jettison the airframe from the payload, as at point 15. This weapon, also, may include a canister-packed parachute 16 arranged to deploy its parachute to effect deceleration of the payload after airframe separation. Upon water entry of the payload, a coupling mechanism joining the parachute canister to the payload operates automatically to release the payload from the canister and parachute assembly.

When fired, the self-thrusting weapon accelerates and consequently increases its velocity until, as at point 14, release and jettisoning of the motor, and thrust cutoff, are effected under control of the preset programming apparatus and preferably in response to the weapon's acquiring a preselected magnitude of velocity. Following thrust termination at that preselected magnitude of velocity, the weapon continues along an essentially ballistic trajectory 20 until, at the point 15 corresponding to and reached at the airframe-separation instant determined by the preset control or programming apparatus, a small explosive device carried by the weapon is detonated to rupture the airframe clamping band and to thus enable hinged members 21, 22 of the airframe to be released from engagement with the payload 11. As the hinged members of the airframe disengage and open in airbrake fashion, the airframe experiences abrupt retardation relative to the payload. In the course of such retardation, the hinged airframe members 21, 22 may break apart as indicated. At this time also, a parachute-extracting lanyard, extending from the packed parachute and secured to the lowermost hinged member of the airframe, extracts the parachute canopy 16 and its shroud lines 23 from the parachute canister, then comes under greater tension and breaks to free the parachute from the airframe. The payload 11 continues in air flight toward the suspect area, but under parachute drag and therefore along a descending path as shown, and with decrease in speed to a safe water-entry value. In response to the deceleration force experienced at water entry of payload 11, the coupling mechanism automatically unlocks, releasing the canister and parachute assembly and enabling payload 11 to proceed unimpeded in its underwater phase of attack against the target submarine 24.

It will be understood that the antisubmarine weapon disclosed herein is intended for use with a fire control system operable in such manner that the training direction of the weapon launcher, and the programming apparatus in the weapon itself, may be suitably set in accordance with target information to result in delivery of the weapon to the suspect or predicted target area. This presetting may be accomplished simply by manual control before launching; in its most advanced version, such a system may be automatized to continuously provide training orders for the weapon launcher, and thrust cutoff and airframe separation orders for the weapon itself, so that the weapon is always suitably set and ready to be fired at any instant in the period during which the launching vessel is at suitable position and range relative to the target submarine to be attacked. Further description of suitable fire control systems, however, is not included herein since details thereof are unnecessary to an understanding of the present invention which is concerned with the weapon per se. It should also be understood that the representation in FIG. 1 is simply schematic, and that the antisubmarine weapon 10 therein is shown in exaggerated relative size for ease of illustration.

Salient structure of an exemplary embodiment of the improved rocket-thrown weapon 10 is illustrated in FIG. 2. Payload 11 in this instance is a homing torpedo having a shroud ring type of tail section structure. Airframe 12 is essentially a bivalvular structure, comprising a pair of comparatively short semicylindrical shell members 21 and 22 which are hinged together at their rearmost extremities in a manner shown later. Rocket motor 13 is clamped to the airframe as a prolongation thereof, after first binding the airframe shell members 21, 22 into engagement with torpedo 11, with remaining weapon components being mounted within the airframe. The fins 27 secured in a cruciform configuration to rocket motor 13 provide aerodynamic stability during the thrust phase of weapon air flight. Airframe 12 is provided with a like configuration of fins 28 to maintain aerodynamic stability during the ballistic air flight phase after the rocket motor has been jettisoned.

As detailed in FIG. 3 (a sectional view taken in the region indicated by arrow 3 in FIG. 2), and with reference also to FIG. 4 (a view taken along line 4—4 of FIG. 3), shell members 21, 22 of the airframe are provided with substantially semicylindrical upper and lower aft support members 31 and 32, respectively, secured thereto in any suitable manner, e.g. by welding. These aft support members 31, 32 serve not only as part of the hinging structure (see FIG. 4) for the bivalvular airframe, but also serve to support a control housing 33 (see FIG. 3) which carries the thrust cutoff and airframe separation control or programming apparatus. The airframe shell members 21, 22 in this instance are hinged simply by means of pivot bolts 34, 35 extending through these members and threadedly engaging hinge plates 36, 37 secured to the upper and lower support members 31 and 32, respectively, as shown. Control housing 33, which may be secured by any suitable means to the lower support member 32 in the course of weapon assembly, is provided with a circumferential flange 38 which mates with restraining grooves formed in the upper and lower support members 31, 32 as indicated. Electrical connector 39, secured to the control housing structure 33 and electrically associated with equipment therein, extends through lower members 22 and 32 as shown, and may be of any type adapted for use with a mating breakaway connector (not shown) through which programmer setting and rocket motor firing orders are supplied by the fire control system. The airframe shell members 21, 22 are releasably clamped into secure engagement with payload 11, preferably in the same manner as described in the earlier mentioned "Rocket-Thrown Missile" patent application. Thus, in the exemplary embodiment, when airframe shell members 21, 22 are closed against payload 11 and so maintained by a clamping band 40 as shown, the shell members bear against shroud ring 41, and grasp the payload, say, by means of thrust lugs (not shown) mounted upon the inner surfaces of shell members 21, 22 to mate with recesses 42 provided in payload 11 as indicated. Airframe release, at a predetermined instant during air flight of the weapon, is effected by use of one or more explosive block devices 46 fitting into corresponding openings in the airframe and underlying the clamping band 40. When detonated by a firing voltage delivered by the programmer apparatus via cabling 47 from control housing 33, the airframe separation explosive blocks 46 rupture the clamping band 40. To insure opening of the airframe shell members 21, 22 immediately after clamping band 40 has been severed, an ejection spring arrangement is employed at each side of the airframe, e.g., as shown in FIG. 5 wherein the spring 50, carried by a spring guide 51 which terminates in a seat member 52, is under compression between brackets 53 and 54 secured to the upper and lower airframe shell members 21 and 22, respectively.

Again as in the earlier mentioned "Rocket-Thrown Missile," this weapon may include, as indicated, a packed parachute assembly, a parachute-extracting arrangement which brings the parachute canopy into play at airframe separation time, and parachute assembly jettisoning means which frees the payload upon water entry. In the illustrated embodiment, the drag parachute is encased in a canister 55 which is mounted upon a stub extension of the torpedo propeller shaft by means of a releasable coupling 56. The parachute shroud lines are secured to the canister, and static line 57 extending from the parachute canopy is anchored to the lowermost member 22 of the airframe. Extraction and deployment of the parachute canopy is thus accomplished automatically when the airframe is jettisoned during air flight, as will appear. Coupling mechanism 56 may likewise be a standard component, functioning to jettison the canister 55 and its attached parachute in response to water impact of the payload.

The antisubmarine payload 11 may of course be conventional in all respects except for simple adaptive modification such as provision of the recesses 42 to engage with thrust lugs of the airframe as has been described, and may be fitted with a frangible nose cap 58 to provide a favorable aerodynamic configuration during weapon air flight and to reduce water-entry shock. The programming apparatus, which has been mentioned as encased in control housing 33, may be of any type suitable to provide squib-firing voltages for thrust cutoff and airframe separation at sequential instants corresponding to preadjusted settings and predetermined to provide any desired water-entry range, and may for example be of saturable reactor type as described in the earlier identified "Rocket-Thrown Missile" patent application.

Referring now to the novel structure which accomplishes thrust cutoff in the weapon 10, and with reference in particular to FIG. 3, the solid-propellant rocket motor 13 itself may be entirely conventional except for its forward end structure which adjoins the aft support members 31, 32 of the bivalvular airframe 12. In fully assembled condition as indicated in FIG. 3, the forward end of rocket motor 13 may be regarded as including the circular bulkhead 60 upon which a motor igniter, provided in the form of a displaceable member hereinafter termed an igniter-piston member 61, is mounted by means of machine screws as indicated or in any other suitable manner. Carrying a sealing O-ring 62 in a circumferential groove as shown, the igniter-piston member 61 slidingly fits into the igniter well of the rocket motor, in conventional proximity to the rocket motor propellant grain (not shown) to effect firing thereof, and with free communication to the pressurized propellant gases generated in the pressure chamber of the rocket motor. The igniter well in this instance is formed by an inwardly directed flange 63 of the motor casing 64. Firing of the rocket motor propellant grain by the igniter-piston member 61 takes place in usual manner, initiated by a firing voltage delivered through connector 39 and via cabling 65 to the igniter-piston member.

Igniter-piston member 61 is further specifically dimensioned to present, to the propellant gases under pressure within the rocket motor casing, a cross-sectional area somewhat greater than the total effective area of the multiple ports in nozzle plate 66 of the rocket motor, for purposes which will appear.

The forward end of the rocket motor is also provided with a peripheral flange structure 70 adapted to mate with a cylindrically protruding flange structure 71 formed upon the aft support members 31 and 32, and further adapted to clamp bulkhead 60 between the said flange structures 70 and 71, and with the igniter-piston member 61 engaged within the associated cylinder formed by the igniter well. With the bivalvular airframe 12 and rocket motor 13 associated in the foregoing manner, the flanges 70, 71 and the bulkhead 60 taken together present a peripheral and outwardly extending juncture flange as shown in the cross-sectional view given in FIG. 3. Airframe 12 and rocket motor 13 are securely joined in such association by means of several circumferentially distributed clamping members 73, channeled in cross section and strapped in place by means of band 74 to engage the juncture flange with clamping action, as indicated. In order to provide for unclamping of the juncture flange, thus enabling jettisoning of the rocket motor as next described, the illustrated embodiment further includes a motor-separation explosive block 75, underlying band 74 as shown in FIG. 3 and detailed in FIG. 6, and adapted to be detonated by a firing voltage delivered by the programmer apparatus via cabling 76 from control housing 33. Explosive block 75 is mounted on bulkhead 60, e.g. by means of machine screws as indicated, and is accommodated within a notch 77 formed in the upper support member 31.

In response preferably to the weapon reaching a predetermined velocity very soon after the launch instant, motor-separation explosive block 75 is detonated, banding 74 is ruptured, and flanges 70, 71 are thus released from the clamping action of members 73. Due to rocket motor chamber pressure, and since the igniter-piston member 61 carried by bulkhead 60 has a slightly greater area than the total effective thrust area of the multiple ports in nozzle plate 66, piston member 61 experiences a force which opposes and is greater than the total effective force which opposes and is greater than the total effective force of the propulsive gases streaming through the nozzle plate 66. The resultant net force thus operates to separate the rocket motor 13 from the shielding bulkhead 60 and from the airframe, clearing igniter-piston member 61 from its cylinder, and effecting thrust cutoff for the remaining airframe and payload assembly. At this time, also, the igniter well, from which igniter-piston member 61 has been withdrawn, functions as a forwardly directed motor nozzle, and the rocket motor now experiences a net rearward thrust which reduces its own forward velocity, causing it to fall behind the remaining weapon assembly which continues in ballistic air flight at substantially the velocity acquired at the time of thrust cutoff. Ensuing events occurring during the continuing air flight of the weapon as already described effect delivery of the antisubmarine payload 11 to the suspect target area.

It will be understood that while the detailed description of the invention has been given in terms of an antisubmarine weapon specifically employing a homing torpedo, other types of antisubmarine payloads may be used, e.g. of depth charge type having extremely high yield, employed with or without terminal air flight deceleration means, and adapted to detonate at a predetermined instant or at a predetermined depth or in response to other factors, but that the particular payload or details thereof are of no concern to the present invention, and further that the invention is not necessarily limited for use with antisubmarine payloads.

It will also be understood that while the exemplary embodiment of the invention includes the bulkhead member 60 as a separate component, stationed between rocket motor 13 and the remaining forward section of the missile, and carrying an igniter-piston member 61, various changes will occur to those skilled in the art. By way of example, the bulkhead means may be made integral with or form a part of the missile structure stationed forwardly of the rocket motor, or the rocket motor may be provided with other ignition means and the bulkhead may be designed simply to obturate a forward port provided in the rocket motor, or other structure may be provided for effecting release and jettisoning of the rocket motor with rearwardly directed thrust brought into play at a desired instant prior to motor burnout.

Obviously many other modifications and variations of the present invention are possible in the light of the above teachings. It is therefore to be understood that within the scope of the appended claims the invention may be practiced otherwise than as specifically described herein.

What is claimed is:

1. A missile for use against a target submarine, comprising, in combination:

a forward section including a payload apparatus for delivery to a suspect water area;

a rocket motor stationed rearwardly of said forward section and in axial alignment therewith, to provide a thrust phase of missile flight;

said rocket motor comprising a nozzle structure at its aft extremity to direct motor pressurized propellant gases rearwardly, and further having a port at its forward extremity;

a bulkhead structure stationed immediately forward of said rocket motor and in obturating relationship to said port;

releasable fastening means securing said rocket motor to said forward section and maintaining said port-obturating relationship;

said port having an orifice area greater than the effective orifice area of said nozzle structure;

said rocket motor thereby being continuously subjected, during generation of pressurized propellant gases, to a net force tending to separate it from said airframe and bulkhead structure;

said rocket motor having a characteristic maximum period of thrust generation;

and means for releasing said fastening means, whereby to separate and jettison said rocket motor and correspondingly terminate said thrust phase of missile flight, predeterminately during missile flight and prior to expiration of said characteristic maximum period.

2. A missile for use against a target submarine, comprising, in combination:

a forward section including a payload apparatus for delivery to a suspect water area;

a rocket motor stationed externally rearward of said forward section and in axial alignment therewith, to provide a thrust phase of missile flight;

said rocket motor comprising a nozzle structure at its aft extremity to direct rocket motor pressurized propellant gases rearwardly, and further having a port at its forward extremity;

a bulkhead structure stationed immediately forward of said rocket motor and in obturating relationship to said port, said bulkhead structure including a piston member slidingly engaged in said port;

releasable fastening means securing said rocket motor to said forward section and maintaining said port-obturating relationship;

said port having an orifice area greater than the effective orifice area of said nozzle structure;

said rocket motor thereby being continuously subjected, during generation of pressurized propellant gases, to a net force tending to separate it from said airframe and bulkhead structure;

said rocket motor having a characteristic maximum period of thrust generation;

and means for releasing said fastening means, whereby to separate and jettison said rocket motor and correspondingly terminate said thrust phase of missile flight, predeterminately during missile flight and prior to expiration of said characteristic maximum period.

3. A missile for use against a target submarine, comprising, in combination:
- a payload apparatus for delivery to a suspect water area;
- an airframe carrying said payload apparatus;
- a rocket motor stationed externally rearward of said airframe and in axial alignment therewith, to provide a thrust phase of missile flight;
- said rocket motor comprising a nozzle structure at its aft extremity to direct rocket motor pressurized propellant gases rearwardly, and further having a port at its forward extremity;
- a bulkhead structure stationed immediately forward of said rocket motor and in obturating relationship to said port;
- releasable fastening means securing said rocket motor to said airframe and maintaining said port-obturating relationship;
- said port having an orifice area greater than the effective orifice area of said nozzle structure;
- said rocket motor thereby being continuously subjected, during generation of pressurized propellant gases, to a net force tending to separate it from said airframe and bulkhead structure;
- said rocket motor having a characteristic maximum period of thrust generation;
- first means for releasing said fastening means, whereby to separate and jettison said rocket motor and correspondingly terminate said thrust phase of missile flight, predeterminately during missile flight and prior to expiration of said characteristic maximum period;
- and second means for predeterminately later releasing said payload apparatus.

4. A missile for use against a target submarine, comprising, in combination:
- a payload torpedo for delivery to a suspect water area;
- an airframe carrying said payload torpedo;
- a rocket motor stationed as a rearward extension of said airframe and in axial alignment therewith, to provide a thrust phase of missile flight;
- said rocket motor comprising a nozzle structure at its aft extremity to direct rocket motor pressurized propellant gases rearwardly, and further having a port at its forward extremity;
- a bulkhead structure stationed immediately forward of said rocket motor and in obturating relationship to said port, said bulkhead structure including a piston member slidingly engaged in said port;
- releasable fastening means securing said rocket motor to said airframe and maintaining said port-obturating relationship;
- said port having an orifice area greater than the effective orifice area of said nozzle structure;
- said rocket motor thereby being continuously subjected, during generation of pressurized propellant gases, to a net force tending to separate it from said airframe and bulkhead structure;
- said rocket motor having a characteristic maximum period of thrust generation;
- first means for releasing said fastening means, whereby to separate and jettison said rocket motor and correspondingly terminate said thrust phase of missile flight, predeterminately during missile flight and prior to expiration of said characteristic maximum period;
- second means for predeterminately later releasing said payload torpedo;
- and means for decelerating said payload torpedo prior to water entry thereof.

5. A missile for use against a target submarine, said missile comprising, in combination:
- a payload apparatus for delivery to a predetermined sea water area;
- an airframe separably joined to said payload apparatus;
- a rocket motor secured by releasable fastening means to said airframe as a rearward extension thereof and operative to provide a thrust phase of missile flight, said rocket motor having a characteristic maximum period of thrust generation;
- first means for predeterminately releasing said fastening means prior to expiration of said characteristic maximum period;
- forward thrust overbalancing means operative upon release of said fastening means to separate and jettison said rocket motor from the airframe;
- second means for predeterminately later releasing and jettisoning said airframe from the payload apparatus;
- and means for decelerating said payload apparatus prior to water entry thereof.

6. A missile comprising, in combination:
- a forward section including a payload apparatus;
- a rocket motor having a characteristic maximum period of thrust generation;
- releasable fastening means securing said rocket motor to said forward section;
- means for predeterminately releasing said fastening means during missile flight and prior to expiration of said maximum period;
- and forward thrust overbalancing means then operative, as a result of release of said fastening means, to separate and jettison the rocket motor.